US008662220B2

(12) United States Patent
Burkholder

(10) Patent No.: US 8,662,220 B2
(45) Date of Patent: Mar. 4, 2014

(54) POWER MANAGEMENT SYSTEM FOR A VEHICLE, METHOD FOR MANAGING VEHICLE POWER AND METHOD FOR INSTALLING A VEHICLE POWER MANAGEMENT SYSTEM

(75) Inventor: Nelson Burkholder, St. Thomas, PA (US)

(73) Assignee: Mack Trucks, Inc., Greensboro, NC (US)

( * ) Notice: Subject to any disclaimer, the term of this patent is extended or adjusted under 35 U.S.C. 154(b) by 411 days.

(21) Appl. No.: 12/307,757

(22) PCT Filed: Aug. 2, 2006

(86) PCT No.: PCT/US2006/030286
§ 371 (c)(1),
(2), (4) Date: Jan. 7, 2009

(87) PCT Pub. No.: WO2008/016357
PCT Pub. Date: Feb. 7, 2008

(65) Prior Publication Data
US 2009/0314563 A1   Dec. 24, 2009

(51) Int. Cl.
*B60W 20/00* (2006.01)
*B60W 10/30* (2006.01)
(52) U.S. Cl.
USPC .............. 180/65.275; 180/65.28; 180/65.285; 180/65.29
(58) Field of Classification Search
USPC ................... 180/65.21, 65.265, 65.27, 65.28, 180/65.285
See application file for complete search history.

(56) References Cited

U.S. PATENT DOCUMENTS

| | | | |
|---|---|---|---|
| 4,438,342 A | 3/1984 | Kenyon | |
| 6,354,096 B1 * | 3/2002 | Siler et al. | 62/183 |
| 6,482,124 B2 * | 11/2002 | Hormann et al. | 477/99 |
| 6,598,496 B2 * | 7/2003 | Pannell | 74/665 L |
| 7,237,634 B2 * | 7/2007 | Severinsky et al. | 180/65.23 |

(Continued)

FOREIGN PATENT DOCUMENTS

JP       2004237907 A       8/2004

OTHER PUBLICATIONS

International Search Report and Written Opinion for corresponding International Application PCT/US2006/030286.

(Continued)

*Primary Examiner* — Jeffrey J Restifo
*Assistant Examiner* — Erez Gurari
(74) *Attorney, Agent, or Firm* — WRB-IP LLP

(57) ABSTRACT

A power management system is provided for a vehicle having an internal combustion engine adapted to deliver power to vehicle drive wheels for propelling the vehicle and an engine powered component powered by the engine. The system includes a battery, a battery powered component powered by the battery, the battery powered component and the engine powered component being adapted to perform substantially the same functions, and a controller arranged to stop operation of the engine powered component so that additional engine power is available to the drive wheels, and to initiate operation of the battery powered component, when power sought to be delivered to the vehicle drive wheels from the engine reaches a predetermined percentage of maximum engine load.

31 Claims, 2 Drawing Sheets

(56) References Cited

U.S. PATENT DOCUMENTS

| | | |
|---|---|---|
| 2003/0000500 A1 | 1/2003 | Chatfield |
| 2004/0034460 A1* | 2/2004 | Folkerts et al. ........... 701/54 |
| 2004/0129407 A1 | 7/2004 | Stone et al. |
| 2004/0168841 A1 | 9/2004 | Ohta et al. |
| 2005/0066914 A1 | 3/2005 | Avery, Jr. et al. |
| 2005/0080537 A1 | 4/2005 | Cawthorne et al. |
| 2005/0182526 A1 | 8/2005 | Hubbard et al. |
| 2005/0193963 A1 | 9/2005 | Hedrick et al. |

OTHER PUBLICATIONS

Japanese Search Report for corresponding Japaesel Application 2009-522744.

Supplementary European Search Report (Mar. 6, 2013) for corresponding European App. EP 06 80 0714.

* cited by examiner

POWER MANAGEMENT SYSTEM FOR A VEHICLE, METHOD FOR MANAGING VEHICLE POWER AND METHOD FOR INSTALLING A VEHICLE POWER MANAGEMENT SYSTEM

BACKGROUND AND SUMMARY

The present invention relates to vehicle power management systems and, more particularly, to vehicle power management systems for vehicles having at least one engine driven component.

In most motor vehicles driven by internal combustion engines, only a fraction of the potential energy available from the fuel is actually used to drive the vehicle's drive wheels. Various other components are driven by the engine and use up some of the energy that would otherwise be available for driving the drive wheels. In addition, there are losses due to incomplete combustion, heat losses, the exhaust system, and friction. Also, when vehicles travel downhill, a substantial amount of kinetic energy is wasted because vehicle or engine brakes must be used to slow the vehicle down.

To illustrate, when a truck with a 350 HP engine is driven with an engine speed of about 1800 RPM is driven uphill and the engine is operated at its maximum load, typically approximately 50 HP is used to operate the engine fan, approximately 9 HP is used to operate the alternator, approximately 7 HP is used to operate the air conditioner compressor, and between 7-12 HP is used to operate the brake air compressor. This means that only about 270 HP of the total 350 HP available can be used to drive the vehicle's drive wheels. Often, a substantially greater fraction of the total available horsepower is not used to drive the vehicle's drive wheels.

When it is desired to slow the vehicle down, or to keep the vehicle within a desired speed range when the vehicle is driven downhill, the engine typically operates at substantially less than maximum load. At the same time, energy is often wasted to brake the vehicle.

It is desirable to provide a vehicle with a means of using more of its available engine power to drive the drive wheels of the vehicle when the engine is under high load. It is also desirable to provide a vehicle with a means of using braking energy to power vehicle components that would otherwise be powered by the vehicle's internal combustion engine.

In accordance with an aspect of the present invention, a vehicle with a power management system comprises a battery, an internal combustion engine adapted to deliver power to a vehicle load, a battery powered component powered by the battery, an engine powered component powered by the engine, the battery powered component and the engine powered component being adapted to perform substantially the same functions, and a controller arranged to stop operation of the engine powered component so that additional engine power is available to the vehicle load, and to initiate operation of the battery powered component, when power sought to be delivered to the vehicle load from the engine reaches a predetermined percentage of maximum engine load.

In accordance with another aspect of the present invention, a method for managing power in a vehicle comprises monitoring an amount of power sought to be delivered from the vehicle's engine to a vehicle load, operating an engine powered component powered by the engine when the amount of power sought to be delivered from the vehicle's engine to the vehicle load is no greater than a predetermined percentage of maximum engine load, and stopping operation of the engine powered component so that additional engine power is available to the vehicle load and operating a battery powered component powered by a battery and adapted to perform substantially the same function as the engine powered component when the amount of power sought to be delivered from the vehicle's engine to the vehicle load exceeds the predetermined percentage of maximum engine load.

In accordance with yet another aspect of the present invention, a method for making a vehicle with a power management system comprises installing in a vehicle a battery, an internal combustion engine adapted to deliver power to a vehicle load, a battery powered component powered by the battery, and an engine powered component powered by the engine, the battery powered component and the engine powered component being adapted to perform substantially the same functions. The method also comprises programming a controller to stop operation of the engine powered component so that additional engine power is available to the vehicle load, and to initiate operation of the battery powered component, when power sought to be delivered to the vehicle load from the engine reaches a predetermined percentage of maximum engine load.

In accordance with yet another aspect of the present invention, a power management system is provided for a vehicle having an internal combustion engine adapted to deliver power to a vehicle load for propelling the vehicle and an engine powered component powered by the engine. The system comprises a battery, a battery powered component powered by the battery, the battery powered component and the engine powered component being adapted to perform substantially the same functions, and a controller arranged to stop operation of the engine powered component so that additional engine power is available to the vehicle load, and to initiate operation of the battery powered component, when power sought to be delivered to the vehicle load from the engine reaches a predetermined percentage of maximum engine load.

BRIEF DESCRIPTION OF THE DRAWINGS

The features and advantages of the present invention are well understood by reading the following detailed description in conjunction with the drawing in which like numerals indicate similar elements and in which.

DETAILED DESCRIPTION

Figure 1:
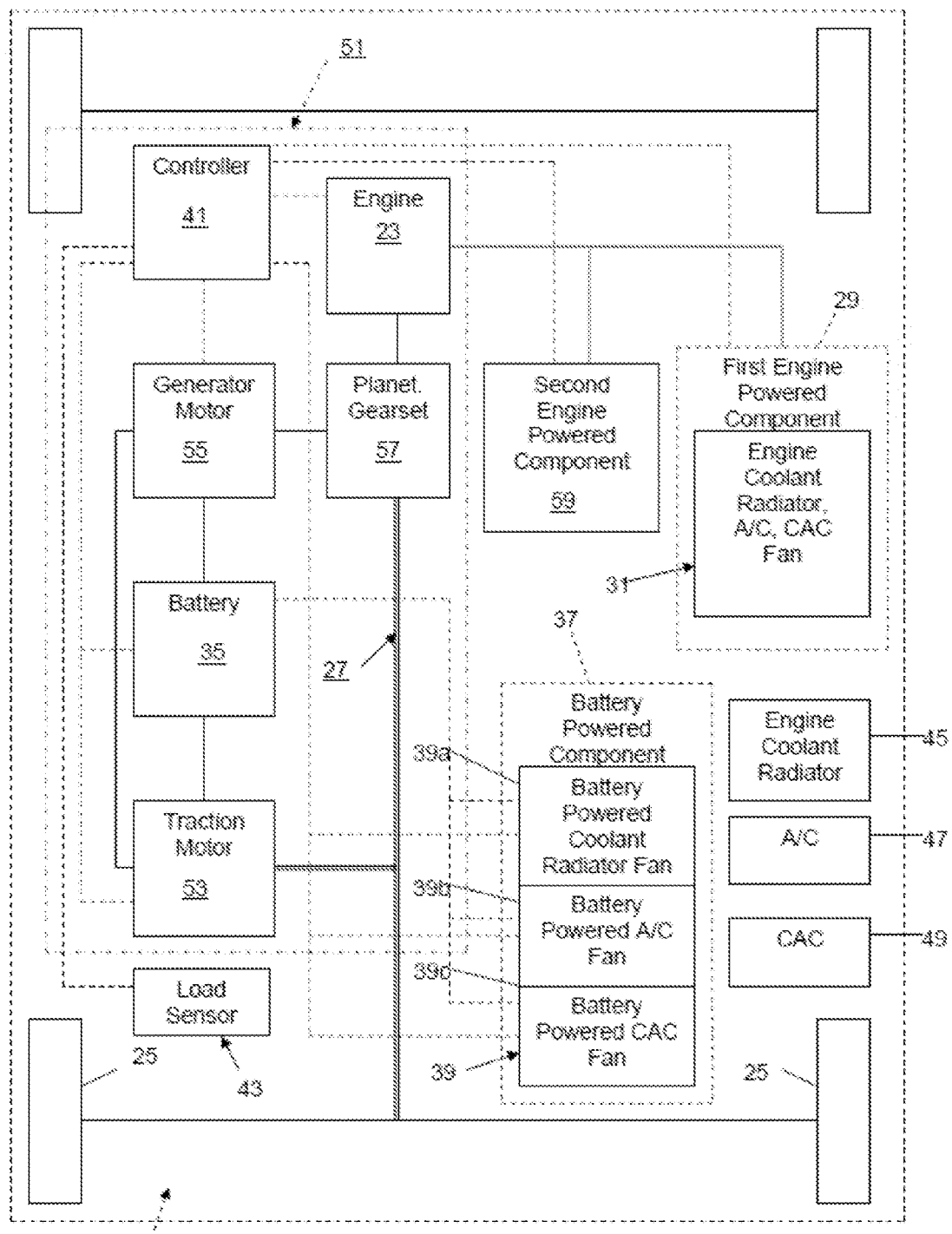
FIG. 1 is a schematic view of a vehicle with a power management system according to an embodiment of the present invention.

A vehicle 21 with a power management system is shown in FIG. 1. The vehicle 21 comprises an internal combustion engine 23 adapted to deliver power to vehicle drive wheels 25 in a conventional manner, e.g., through connection through a driveshaft 27, for propelling the vehicle. It is presently believed that the engine 23 can be any type of internal combustion engine, however, it is anticipated that the present invention will be particularly useful in connection with diesel engines. The vehicle 21 also comprises an engine powered component 29, such as a fan 31, powered by the engine 23, such as via a drive connection such as a pulley and belt arrangement. The engine powered component 29 may be some other device, such as a power take-off (PTO) device. The engine powered component 29 may also be a plurality of devices that perform one or a plurality of functions.

The power management system of the vehicle 21 comprises a battery 35 and a battery powered component 37 that performs the same or substantially the same function as the engine powered component 29. For example, if the engine powered component 29 is a fan 31 (or fans), the battery powered component 37 can also be a fan 39 (or fans). In many vehicles, battery powered fans 39 might be mounted on a pre-existing fan mounting cross-over bar assembly.

The power management system of the vehicle 21 also comprises a controller 41 arranged to stop the engine powered component 29, such as by disengaging the drive connection between the engine powered component and the engine 23, so that additional engine power is available to the drive wheels 25, and to initiate operation of the battery powered component 37, 35, when power sought to be delivered to the vehicle drive wheels from the engine reaches a predetermined percentage of maximum engine load. Maximum engine load is a substantially constant value for each engine, although it will typically differ from engine type to engine type, and may include variations within an engine type. The amount of power sought to be delivered to the vehicle drive wheels 25 from the engine 23 can be determined in any conventional fashion, such as mathematically using various inputs, by sensing load with a load sensor 43, such as a throttle position sensor, a manifold pressure sensor, a mass airflow sensor positioned to sense air flowing into one or more cylinders of the engine 23, or the amount of fuel delivery.

The controller 41 can be arranged, e.g., programmed, to stop operation of the engine powered component 29, and to initiate operation of the battery powered component 37, 35, when the power sought to be delivered to the vehicle drive wheels 25 from the engine 23 is the predetermined percentage, such as at least as great as about 90% and possibly as high as 100%, of maximum engine load. This type of high loading may occur, for example, when the vehicle is accelerating onto a highway or to pass another vehicle, when it is going uphill, or in stop-and-go traffic.

In the embodiment of FIG. 1, the battery powered component 37 and the engine powered component 29 each comprise at least one fan 39 and 31, respectively, which is used to cool at least one of engine coolant, air conditioning coolant, and air for a charge air cooler. Where the engine powered component 29 comprises one or more components, such as one or more engine-driven fans 31 for a separate engine coolant radiator 45, air conditioning coolant radiator 47, and charge air cooler air radiator 49, a corresponding number of battery powered components 37 or a different number of battery powered components may be used.

In FIG. 1, one or a bank of a plurality, e.g., three, six, nine, etc. battery powered fans 39a-39c can be used to replace a single engine-driven fan 31. For example, in some circumstances, it may be desirable to operate two battery operated fans 39a to replace engine-driven fan 31 while, in other circumstances, it may be desirable to operate only one of the two battery operated fans. The controller 41 can be arranged to initiate operation of an appropriate number of, and appropriate ones of, the battery operated fans 39a-39c depending upon inputs from various sensors (not shown) that can be provided with the vehicle. For example, a sensor may indicate that battery power is below a certain level and, if an engine-driven fan 31 for an air conditioning coolant radiator 47 is disengaged from being driven by the engine 23, the controller 41 may refrain from initiating operation of one or more of the counterpart battery operated fans 39a, 39b, 39c.

Of course, particularly in the case of fans, there may be circumstances where operation of an engine powered component 29 may be suspended, e.g., the drive connection between the engine 23 and the fan 31 may be disengaged, and where it is not necessary to initiate operation of a counterpart battery operated component 37. This may be the case where, for example, the vehicle 21 is moving at a certain speed and, as a result, air flows through a radiator core without the need for a fan. This may also be the case where, for example, the vehicle 21 is warming up and it is not yet necessary to cool the coolant.

Figure 2:
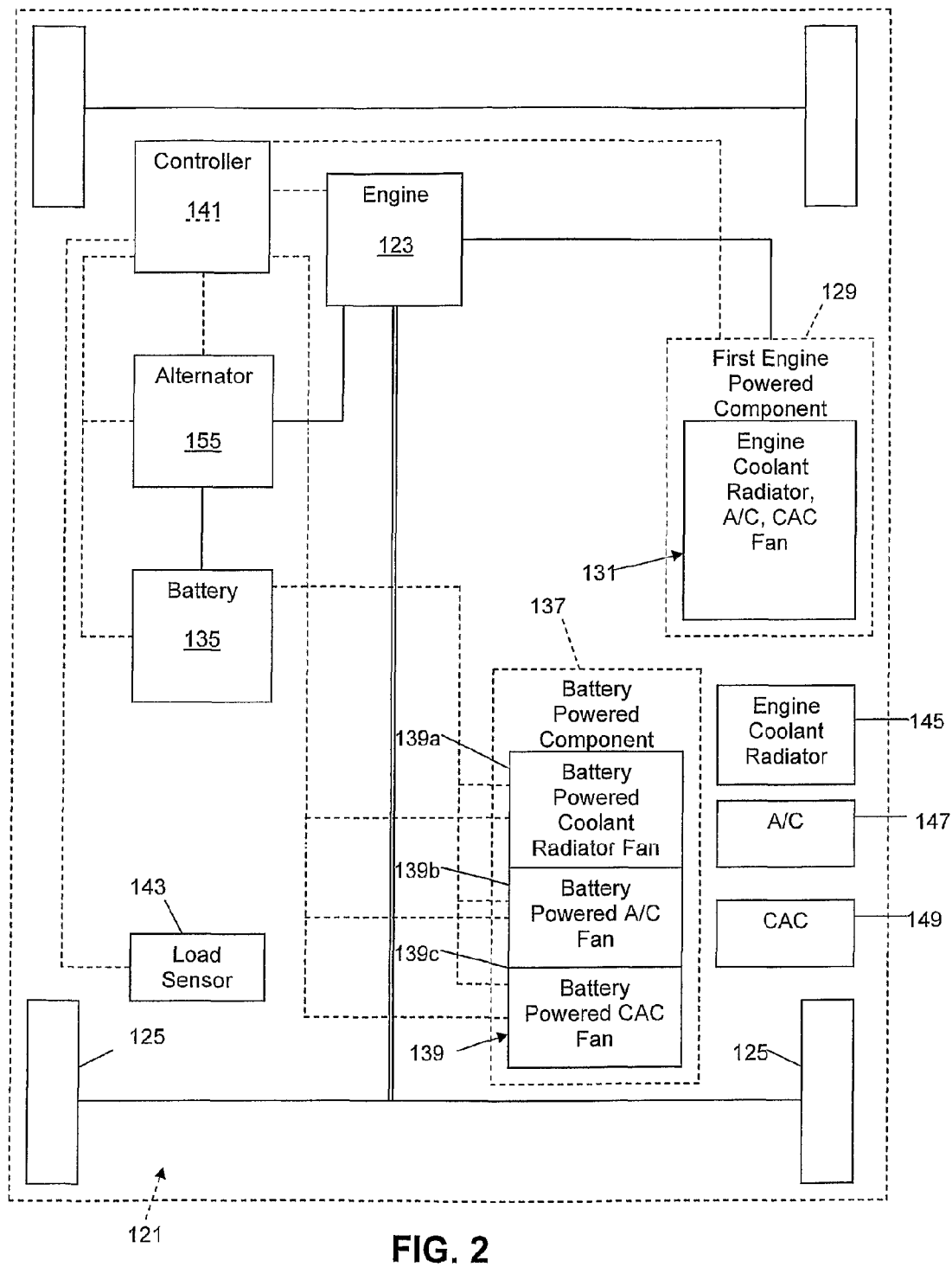
FIG. 2 is a schematic view of a vehicle with a power management system according to another embodiment of the present invention.

The power management system of the vehicle 21 may also comprise a regenerative braking arrangement 51 associated with at least one of the engine and a vehicle braking arrangement for converting mechanical energy into electrical energy and charging the battery. In the embodiment of FIG. 1, which is merely illustrative of a conventional form of regenerative braking arrangement 51, the vehicle 21 comprises a regenerative braking arrangement comprising a traction motor 53, the battery 35, a generator motor 55, and a planetary gearset 57. The vehicle 21 can be operated as an electric vehicle when the traction motor 53 draws energy from the battery 53 to turn the drive wheels 25 without using the internal combustion engine 23, such as to propel the vehicle at low speeds. Alternatively, the vehicle 121 may be of the type that does not have any fully electric vehicle mode of operation, such as is shown in FIG. 2.

With reference to the embodiment of FIG. 1, when the vehicle is operated at moderate speeds or loads, it can be operated in a positive split mode in which the engine 23 and the traction motor 53 and generator motor 55 can be used to turn the drive wheels 25. The generator motor 55 produces energy from the engine's 23 output, and this energy can be used to charge the battery 35 or power the traction motor 53. In high load situations, the regenerative braking arrangement 51 can be operated in a negative split mode in which power from the engine 23 is transferred to the vehicle drive wheels 25 through the planetary gearset 57, the generator motor 55 can be operated to reduce the speed of the engine 23, and the traction motor 53 can be used as a generator to provide power to the generator motor. In addition to or instead of using energy from the battery 35 to operate the generator motor 55, at certain, generally high, loads the battery can be used to power the battery powered component 37. Also, at high loads, it may be desirable to deliver only power from the engine 23 to the vehicle drive wheels 25 and provide no power from the regenerative braking arrangement 51 to the vehicle drive wheels. Instead, all power from the battery 35 can be used to operate the battery powered component 37 instead of using any engine power to operate the engine driven component 29.

The controller 41 can be arranged to initiate operation of the regenerative braking arrangement 51 to charge the battery 35 when the power sought to be delivered to the vehicle drive wheels 25 from the engine 23 is below a second predetermined percentage of maximum engine load. The second predetermined percentage will ordinarily be less than 100% of maximum engine load, and usually only when the vehicle is operated at moderate or low speeds or loads and only a moderate or low amount of total available power is needed to be delivered to the vehicle drive wheels from the engine.

The controller 41 will ordinarily be arranged to initiate and stop operation of the engine powered component 29, to initiate and stop operation of the battery powered component 37, 35, and to initiate and stop operation of the regenerative braking arrangement to charge the battery and to draw power from the battery. Ordinarily, these tasks will be performed with a view toward optimizing fuel economy and power consumption, and as a function of the amount of power sought to be delivered to the drivewheels 25 (or other equipment such as power take-off equipment). For example, when less than some predetermined percentage of maximum engine load is sought to be delivered to the drive wheels, it may be useful to alternate between operating the engine powered component 29 and the battery powered component 37, and between charging or draining the battery 35, or neither charging nor draining it. When some other, lower predetermined percentage of maximum engine load is sought to be delivered to the drivewheels 25, the controller 41 can be arranged to tend to operate the engine powered component 29 and recharge the battery 35 more frequently, and operate the battery powered component 37 less frequently, than when some higher predetermined percentage of maximum engine load is sought to be delivered to the drivewheels. Other factors, such as engine and cabin temperature, ambient temperature, optimizing performance of emissions control equipment, cabin fan speed, battery voltage, temperature, and health, combustion air temperature, air compressor status, vehicle speed, key off cooldown command to engine, humidity and the like may also or instead be considered when the controller determines when the tasks will be performed.

When the power sought to be delivered to the vehicle drive wheels 25 from the engine 23 is below certain percentages of maximum engine load, the controller 41 can be arranged to initiate and, if appropriate, stop operation of the engine powered component 29, to stop operation of the battery powered component 37, and to initiate operation of the regenerative braking arrangement 51 for charging the battery 35. For example, this might be the default mode when the vehicle 21 is going downhill, or when the power sought to be delivered to the vehicle drive wheels is at or below, for example, about 10% of maximum engine load, although these operating conditions might be appropriate at substantially higher percentages of maximum engine load. While, in such a situation, the engine powered component 29 would ordinarily be powered by the engine 23, it may be appropriate to turn off the engine powered component in some circumstances, such as when the engine powered component is a fan 31 and the vehicle is moving at a sufficiently high rate of speed that air coming through the engine grill is sufficient for cooling.

The vehicle 21 can comprise an additional engine powered component 59 powered by the engine 23. The additional engine powered component 59 may be any type of component ordinarily powered by the engine 23, such as a power take-off (PTO) for operating auxiliary equipment such as cement mixers and the like. While, often, operation of certain additional engine powered components 59 such as PTOs will have priority over operation of other engine powered components, the controller 41 can nonetheless be arranged to stop operation of any additional engine powered component 59 so that, for example, additional engine power is available to the drive wheels when power sought to be delivered to the vehicle drive wheels 25 from the engine 23 reaches a second predetermined percentage of maximum engine load, or so that additional engine power is available to the PTO when power sought to be delivered to the PTO reaches some predetermined percentage of maximum engine load, etc.

The second predetermined percentage of maximum engine load will ordinarily be less than the first predetermined percentage of maximum engine load. For example, when only the first engine powered component 29 is being powered by the engine 23, the controller 41 might be arranged to stop operation of the first engine powered component when the percentage of power sought to be delivered to the vehicle wheels 23 reaches or exceeds about 90% of maximum available power. When the first and second engine powered components 29 and 59 are being powered by the engine 23, the controller 41 might be arranged to stop operation of the second engine powered component when the percentage of power sought to be delivered to the vehicle wheels 23 reaches or exceeds about 80% of maximum vehicle power. In this way, the first engine powered component 29 may still be operated up to the point where the percentage of power sought to be delivered to the vehicle wheels 23 reaches or exceeds about 90% of maximum engine load. The second engine powered component 59 may be of a type that can be switched to operation under power of the battery 35; there may be a second battery powered component (not shown) that can perform substantially the same function as the second engine powered component; or the function performed by the second engine powered component may simply not be performed once the controller stops its operation. Alternatively, the first engine powered component 29 may be disengaged and operation of the second engine powered component 59 may continue uninterrupted, as may be desirable when, for example, the second engine powered component is a PTO, such as a cement mixer.

In addition to being arranged to stop operation of the additional engine powered component 59 when power sought to be delivered to the vehicle drive wheels 23 from the engine reaches the second predetermined percentage of maximum engine load, or as an alternative to such an approach, the controller 41 can be arranged to permit initiation of operation of the second engine powered component when the amount of power sought to be delivered from the vehicle's engine to the second engine powered component is no greater than a third predetermined percentage of maximum engine load. This third predetermined percentage of maximum engine load can be different than the first and second predetermined percentages of maximum engine load. It will be appreciated that references to "first", "second", "third", etc. predetermined percentages of maximum engine load are merely provided for reference and do not necessitate that the power management system be provided with operational modes involving all three or more percentages, i.e., reference here to the third predetermined percentage does not necessitate that the controller also control operation of anything based on a second predetermined percentage of maximum engine load.

For example, the controller 41 can be arranged to permit initiation of operation of the second engine powered component 59 when it will draw no more than, say, 50% of maximum available engine load. In this way, availability of power to continue operation of other engine powered components 29 can be substantially ensured whenever the second engine powered component 59 is in use. This operating mode may be useful, for example, when the vehicle 21 is operating in a mode in which it is not possible to charge the battery 35 using the regenerative braking arrangement 51 yet it is still necessary to power components such as fans 31 to cool the engine. The controller 41 may, for example, be arranged to initiate operation the second engine powered component 59 only when no power is delivered from the vehicle's engine to the vehicle's drive wheels 23, such as might be appropriate for certain PTO applications to manage under-hood temperatures.

Referring now to FIG. 2, which shows a vehicle 121 similar to the vehicle 21, except having no hybrid vehicle-type regenerative braking arrangement, the engine 123 can drive a first engine powered component 129 such as a fan 131 for cooling the engine coolant radiator 145, the air conditioning coolant radiator 147, and charge air cooler air radiator 149. When a load sensor 143 senses that more than some predetermined percentage of maximum engine load is sought to be delivered to the drivewheels 125, it can send a signal to the controller 141 to disengage the first engine powered component 129.

The controller 141 can then initiate operation of one or more corresponding battery powered components 137 under battery power, such as one or more fans 139, such as a battery powered coolant radiator fan 139a, a battery powered A/C fan 139b, and/or a Battery powered CAC fan 139c so that the function performed by the engine powered component 129 continues to be performed by battery powered components 137.

In a conventional manner, the engine 123 can also drive an alternator 155 that can power various electronic components, and that can be used to recharge the battery 135. At high engine loads, electrical components that would ordinarily receive electrical power from the alternator 155 when it is driven by the engine 123 can instead be powered by the battery 135. It will be appreciated that the presence of a hybrid drive arrangement as in FIG. 1 does not preclude the presence of an alternator arrangement as in FIG. 2.

Referring now to FIG. 1, a method for managing power in the vehicle 21 can comprise monitoring an amount of power sought to be delivered from the vehicle's engine 23 to the vehicle's drive wheels 25. The engine powered component 29 can be operated only when the amount of power sought to be delivered from the vehicle's engine 23 to the vehicle's drive wheels 25 is no greater than a predetermined percentage of maximum engine load. Operation of the engine powered component 29 can be stopped so that additional engine 23 power is available to the drive wheels 25 and operation can be initiated of a battery powered component 37 powered by a battery 35 and that is adapted to perform substantially the same function as the engine powered component when the amount of power sought to be delivered from the vehicle's engine to the vehicle's drive wheels exceeds the predetermined percentage of maximum engine load.

The regenerative braking arrangement 51 can be operated to charge the battery 35 when the amount of power sought to be delivered from the vehicle's engine 23 to the vehicle's drive wheels 25 is no greater than the predetermined percentage of maximum engine load. The regenerative braking arrangement 51 can be operated to charge the battery 35 when the amount of power sought to be delivered from the vehicle's engine 23 to the vehicle's drive wheels 25 is no greater than a second predetermined percentage of maximum engine load lower than the first predetermined percentage of maximum engine load. For example, operation of the battery powered component 29 may be stopped when the amount of power sought to be delivered to the vehicle's drive wheels 25 from the engine 23 reaches or exceeds about 90% of maximum vehicle power, while operation of the regenerative braking arrangement 51 may be stopped when the amount of power sought to be delivered to the vehicle's drive wheels from the engine reaches or exceeds about 80% of maximum vehicle power. Of course, the regenerative braking arrangement 51 may be operated up to the point where the amount of power sought to be delivered to the vehicle drive wheels reaches the first predetermined percentage of maximum vehicle power.

When the amount of power sought to be delivered from the vehicle's engine 23 to the vehicle's drive wheels 25 is no greater than the predetermined percentage of maximum engine load, the controller 41 can be arranged to alternate between operating the engine powered component 29 and operating the battery powered component 27 as a function of factors including optimal fuel economy and the amount of power sought to be delivered to the vehicle drive wheels from the engine. For example, when the battery 35 is fully charged, it may be more advantageous for the controller 41 to be arranged to operate the battery powered component 27 even though the amount of power sought to be delivered from the vehicle's engine 23 to the vehicle's drive wheels 25 is less than the predetermined percentage of maximum engine load.

An additional engine powered component 59 can be operated when the amount of power sought to be delivered from the vehicle's engine 23 to the vehicle's drive wheels 25 is no greater than a predetermined percentage of maximum engine load. Operation of the additional engine powered component 59 can be stopped so that additional engine power is available to the drive wheels 25 when the amount of power sought to be delivered from the vehicle's engine 23 to the vehicle's drive wheels exceeds a second predetermined percentage of maximum engine load. The second predetermined percentage of maximum engine load is typically, but not necessarily, different than the first predetermined percentage of maximum engine load and typically, but not necessarily, less than the first predetermined percentage of maximum engine load. Instead of stopping operation of the additional engine powered component 59, the controller 41 can be arranged to stop operation of the first engine powered component 29. This may be desirable, for example, when the additional engine powered component 59 is a PTO and stopping its operation would have significant detrimental effects.

An amount of power sought to be delivered from the vehicle's engine 23 to the second engine powered component 59 can be monitored, and the second engine powered component can be operated when the amount of power sought to be delivered from the vehicle's engine to the second engine powered component is no greater than a second predetermined percentage of maximum engine load. For example, where the second engine powered component 59 is a PTO, the controller 41 can be arranged to permit initiation of operation of the PTO up to the second predetermined percentage of maximum engine load, such as 50%. Operation of the first engine powered component 29 can be stopped so that additional engine power is available to the second engine powered component, and the first battery powered component 35 can be operated when the amount of power sought to be delivered from the vehicle's engine 23 to the second engine driven component 59 exceeds the second predetermined percentage of maximum engine load. For example, in some circumstances, it might be desirable to operate the second engine powered component 59, such as a PTO, in favor of operation of the first engine powered component 29, such as the fan 31.

A vehicle 21 with a power management system according to the present invention can be manufactured as part of an integrated production operation or as an aftermarket retro-fit. According to a method for making the vehicle 21 with a power management system, the battery 35, an internal combustion engine 23 adapted to deliver power to vehicle drive wheels 25 for propelling the vehicle, a battery powered component 37 powered by the battery, and an engine powered component 29 powered by the engine are all installed in the vehicle. The battery powered component 37 and the engine powered component 29 are adapted to perform substantially the same functions. The controller 41 is programmed to stop operation of the engine powered component 29 so that additional engine 23 power is available to the drive wheels 25, and to initiate operation of the battery powered component 37, when power sought to be delivered to the vehicle drive wheels from the engine reaches a predetermined percentage of maximum engine load. The battery 35 and/or the battery powered component 37 can be installed subsequent to installing the engine 23 and the engine powered component 29, i.e., in a vehicle retro-fit operation, or as part of an integrated production operation. The battery 35 may be installed as part of an integrated production operation or as part of a retrofit with the battery powered component 37. Similarly, the controller 41 can be installed and/or programmed at the same time as subsequent to installing the engine 23 and the engine powered component 29. The controller 41 may be specially adapted for the vehicle power management system and may be installed with the battery 35 and/or the battery powered component 37, or it may be a programmable controller that is present in the vehicle regardless whether the vehicle has a power management system according to the present invention, and/or it may be programmable for use with the power management system upon installation of other components such as the battery powered component 37 and/or the battery 35.

At a more fundamental level, a power management system for a vehicle 21 can comprise a battery 35, a battery powered component 37 powered by the battery, and a controller 41. The battery powered component 37 is adapted to perform substantially the same function as an engine powered component 29. The controller 41 is arranged to stop operation of the engine powered component 29 so that additional engine 23 power is available to drive wheels 25 of the vehicle, and to initiate operation of the battery powered component 37, when power sought to be delivered to the vehicle drive wheels from the engine reaches a predetermined percentage of maximum engine load. The power management system can also include a regenerative braking arrangement 51 associated with at least one of the engine 23 and a vehicle braking arrangement, which may include a traction motor 53, for converting mechanical energy into electrical energy and charging the battery 35. The controller 41 can be arranged to initiate operation of the regenerative braking arrangement 51 to charge the battery 35 when the power sought to be delivered to the vehicle drive wheels 25 from the engine 23 is below a second predetermined percentage of maximum engine load. The second predetermined percentage of maximum engine load may be the same as the first predetermined percentage of maximum engine load, however, it will ordinarily be different, and will ordinarily be lower.

By appropriately utilizing the vehicle power management system, additional power can be made available to the vehicle drive wheels 25 during high load periods, such as when the vehicle is going up a hill. In addition, otherwise wasted energy can be recovered through regenerative braking and can be used to power the vehicle 21 or battery powered components of the vehicle. The power management system can assist in getting vehicles to move and in keeping vehicles moving at desired speeds by providing additional power to keep them up to speed and by withdrawing energy to keep them from going too fast. Operating components using battery power stored through regenerative braking can result in fuel savings, as well. While it is presently contemplated that the power management system will be of particular use in providing power for battery driven components of the vehicle 21 other than the drive wheels 25, such as fans 39, the power management system can also be used as part of a conventional hybrid vehicle, such as to supplement internal combustion engine 23 power efficiency.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A vehicle with a power management system, comprising:
    a battery;
    an internal combustion engine adapted to deliver power to a vehicle load;
    a battery powered component powered by the battery;
    an engine powered component powered by the engine, the battery powered component and the engine powered component being adapted to perform substantially the same functions;
    a controller arranged to stop operation of the engine powered component so that additional engine power is available to the vehicle load, and to initiate operation of the battery powered component, when power sought to be delivered to the vehicle load from the engine reaches a predetermined percentage of maximum engine load; and
    a second engine powered component powered by the engine, the controller being arranged to permit initiation of operation of the second engine powered component when the amount of power sought to be delivered from the vehicle's engine to the second engine powered component is no greater than a second predetermined percentage of maximum engine load, the controller being arranged to stop operation of the engine powered component so that additional engine power is available to the second engine powered component and to operate the battery powered component when the amount of power sought to be delivered from the vehicle's engine to the second engine driven component exceeds the second predetermined percentage of maximum engine load,
    wherein the battery powered component and the engine powered component are each auxiliary components.

2. The vehicle with a power management system as set forth in claim 1, wherein the controller is arranged to stop operation of the engine powered component, and to initiate operation of the battery powered component, when the power sought to be delivered to the vehicle load from the engine is at least as great as about 90% of maximum engine load.

3. The vehicle with a power management system as set forth in claim 1, wherein the controller is arranged to stop operation of the engine powered component, and to initiate operation of the battery powered component, when the power sought to be delivered to the vehicle load from the engine reaches 100% of maximum engine load.

4. The vehicle with a power management system as set forth in claim 1, comprising a load sensor arranged to send a signal to the controller corresponding to the power sought to be delivered to the vehicle load from the engine.

5. The vehicle with a power management system as set forth in claim 1, wherein the battery powered component and the engine powered component each comprise at least one fan.

6. The vehicle with a power management system as set forth in claim 5, wherein the at least one fan of each of the battery powered component and the engine powered component is used to cool at least one of engine coolant, air conditioning coolant, and coolant for a charge air cooler.

7. The vehicle with a power management system as set forth in claim 6, wherein the at least one fan of each of the battery powered component and the engine powered component is used to cool each of engine coolant, air conditioning coolant, and coolant for a charge air cooler.

8. The vehicle with a power management system as set forth in claim 7, comprising at least one radiator for cooling engine coolant, at least one radiator for cooling air conditioning coolant, and at least one radiator for cooling charge air cooler coolant.

9. The vehicle with a power management system as set forth in claim 7, comprising at least one fan for cooling engine coolant, at least one fan for cooling air conditioning coolant, and at least one fan for cooling charge air cooler coolant.

10. The vehicle with a power management system as set forth in claim 1, comprising a regenerative braking arrangement associated with at least one of the engine and a vehicle braking arrangement for converting mechanical energy into electrical energy and charging the battery.

11. The vehicle with a power management system as set forth in claim 10, wherein the controller is arranged to initiate and stop operation of the engine powered component, to initiate and stop operation of the battery powered component, and to initiate and stop operation of the regenerative braking arrangement for charging the battery.

12. The vehicle with a power management system as set forth in claim 10, wherein the controller is arranged to alternate between initiating and stopping operation of the engine powered component, and between initiating and stopping operation of the battery powered component, when the power sought to be delivered to the vehicle load from the engine is below the first predetermined percentage of maximum engine load.

13. The vehicle with a power management system as set forth in claim 12, wherein the controller is arranged to alternate between initiating and stopping operation of the regenerative braking arrangement for charging the battery when the power sought to be delivered to the vehicle load from the engine is below the first predetermined percentage of maximum engine load.

14. The vehicle with a power management system as set forth in claim 13, wherein the controller is arranged to initiate and stop operation of the engine powered component, initiate and stop operation of the battery powered component, and initiate and stop operation of the regenerative braking arrangement for charging the battery as a function of factors including optimal fuel economy and the amount of power sought to be delivered to the vehicle load from the engine.

15. The vehicle with a power management system as set forth in claim 10, wherein the controller is arranged to initiate and stop operation of the engine powered component, to stop operation of the battery powered component, and to initiate operation of the regenerative braking arrangement for charging the battery when the power sought be delivered to the vehicle load from the engine is below a third predetermined percentage of maximum engine load.

16. The vehicle with a power management system as set forth in claim 15, wherein the third predetermined percentage is less than 100% of maximum engine load.

17. The vehicle with a power management system as set forth in claim 1, wherein the controller is arranged to stop operation of the additional engine powered component so that additional engine power is available to the vehicle load when power sought to be delivered to the vehicle load from the engine reaches a third predetermined percentage of maximum engine load.

18. The vehicle with a power management system as set forth in claim 17, wherein the predetermined percentage of maximum engine load is different than the third predetermined percentage of maximum engine load.

19. The vehicle with a power management system as set forth in claim 1, wherein the second predetermined percentage of maximum engine load is different than the first predetermined percentage of maximum engine load.

20. The vehicle with a power management system as set forth in claim 1, wherein the controller is arranged to initiate operation of the second engine powered component only when no power is delivered from the vehicle's engine to the vehicle load.

21. The vehicle with a power management system as set forth in claim 1, wherein the second engine powered component comprises a power take off.

22. The vehicle with a power management system as set forth in claim 1, wherein the vehicle load comprises vehicle drive wheels for propelling the vehicle.

23. A method for managing power in a vehicle, comprising:
monitoring an amount of power sought to be delivered from the vehicle's engine to a vehicle load;
operating an engine powered component powered by the engine when the amount of power sought to be delivered from the vehicle's engine to the vehicle load is no greater than a predetermined percentage of maximum engine load;
stopping operation of the engine powered component so that additional engine power is available to the vehicle load and operating a battery powered component powered by a battery and adapted to perform substantially the same function as the engine powered component when the amount of power sought to be delivered from the vehicle's engine to the vehicle load exceeds the predetermined percentage of maximum engine load;
operating a second engine powered component powered by the engine when the amount of power sought to be delivered from the vehicle's engine to the vehicle load is no greater than a second predetermined percentage of maximum engine load;
operating a regenerative braking arrangement to Charge the battery when the amount of power sought to be delivered from the vehicle's engine to the vehicle load is no greater than the predetermined percentage of maximum engine load; and
operating the regenerative braking, arrangement to charge the battery When the amount of power sought to be delivered from the vehicle's engine to the vehicle load is no greater than a third predetermined percentage of maximum engine load that is lower than the first predetermined percentage of maximum engine load,
wherein the battery powered component and the engine powered component are each auxiliary components.

24. A method for managing power in a vehicle, comprising:
monitoring an amount of power sought to be delivered from the vehicle's engine to a vehicle load;
operating an engine powered component powered by the engine when the amount of power sought to be delivered from the vehicle's engine to the vehicle load is no greater than a predetermined percentage of maximum engine load;
stopping operation of the engine powered component so that additional engine power is available to the vehicle load and operating a battery powered component powered by a battery and adapted to perform substantially the same function as the engine powered component when the amount of power sought to be delivered from the vehicle's engine to the vehicle load exceeds the predetermined percentage of maximum engine load;
operating a second engine powered component powered by the engine when the amount of power sought to be delivered from the vehicle's engine to the vehicle load is no greater than a second predetermined percentage of maximum engine load; and stopping operation of the engine powered component so that additional engine power is available to the second engine powered component and operating the battery powered component when the amount of power sought to be delivered from the vehicle's engine to the second engine driven component exceeds the second predetermined percentage of maximum engine load, wherein the battery powered component and the engine powered component are each auxiliary components.

25. The method for managing vehicle power as set forth in claim 24, comprising operating a regenerative braking arrangement to charge the battery when the amount of power sought to be delivered from the vehicle's engine to the vehicle load is no greater than the predetermined percentage of maximum engine load.

26. The method for managing vehicle power as set forth in claim 24, comprising alternating between operating the engine powered component and operating the battery powered component when the amount of power sought to be delivered from the vehicle's engine to the vehicle load is no greater than the predetermined percentage of maximum engine load as a function of factors including optimal fuel economy and the amount of power sought to be delivered to the vehicle load from the engine.

27. The method for managing vehicle power as set forth in claim 24, comprising stopping operation of the second engine powered component so that additional engine power is available to the vehicle load when the amount of power sought to be delivered from the vehicle's engine to the vehicle load exceeds the second predetermined percentage of maximum engine load.

28. The method for managing vehicle power as set forth in claim 27, wherein the second predetermined percentage of maximum engine load is different than the first predetermined percentage of maximum engine load.

29. The method for managing vehicle power as set forth in claim 24, wherein the second predetermined percentage of maximum engine load is different than the first predetermined percentage of maximum engine load.

30. The method for managing vehicle power as set forth in claim 24, comprising operating the second engine powered component when no power is delivered from the vehicle's engine to the vehicle load.

31. The method for managing vehicle power as set forth in claim 24, wherein the vehicle load comprises vehicle drive wheels for propelling the vehicle.

* * * * *